Patented June 14, 1949

2,473,003

UNITED STATES PATENT OFFICE 2,473,003

PURIFICATION OF CHLORAL CONTAINING UNDER-CHLORINATED CONSTITUENTS

Harold C. Beachell, Lakewood, and Michael Sveda, Cleveland, Ohio, assignors to E. I. du Pont de Nemours & Company, Wilmington, Del., a corporation of Delaware No Drawing. Application December 1, 1945, Serial No. 632,274

4 Claims. (Cl. 202—57)

This invention relates to processes for producing chloral of relatively high purity and is more particularly directed to such processes in which under-chlorinated constituents present in a crude chloral are polymerized by adding a small amount of concentrated sulfuric acid, and the polymerized constituents are separated from the non-polymerized chloral.

Chloral, otherwise known as trichloracetaldehyde ($Cl_3CCHO$), may be prepared rapidly, and in good yield, by chlorinating ethyl alcohol under ultraviolet light to form the corresponding hemiacetal, adding sulfuric acid, and distilling off chloral. The chemical reactions involved may be represented as follows:

(1) $4C_2H_5OH + 3Cl_2 \xrightarrow{\text{ultraviolet light}} 2Cl_3CCHOHOC_2H_5$ (2) $Cl_3CCHOHOC_2H_5 + H_2SO_4 \longrightarrow ClCCHO + C_2H_5HSO_4 + H_2O$ Unfortunately, the product obtained by chlorinating ethyl alcohol as described above does not consist entirely of the trichloracetaldehyde but contains also from traces to appreciable amounts of dichloracetaldehyde and monochloracetaldehyde. In describing the present invention such dichlor and monochlor derivatives are referred to as underchlorinated materials or constituents. Their presence is undesirable in chloral, particularly when the chloral is to be used as a starting point for manufacturing 1,1-bis(p-chlorophenyl)-2,2,2-trichloroethane, otherwise known as DDT.

Now according to the present invention it has been found that under-chlorinated constituents present in a crude chloral may be eliminated and a chloral of relatively high purity may be produced by processes in which the under-chlorinated constituents are polymerized by adding a small amount of concentrated sulfuric acid and the polymerized products are separated from the non-polymerized chloral. The processes of the invention are particularly well adapted for application to crude chloral containing under-chlorinated materials which was prepared by the chlorination of ethyl alcohol under ultraviolet light followed by distillation of the chloral from concentrated sulfuric acid.

The theoretical explanation of the chemical reactions involved in a process of this invention is not entirely clear. It might be thought, for example, that the large quantity of sulfuric acid used to convert the hemiacetal to chloral according to Equation 2 above should suffice to cause the under-chlorinated material in the chloral to polymerize in this stage of the operation and that the distillation should then remove the monomeric chloral. Such is not found to be the case, however. Under the conditions of the distillation as heretofore practiced the under-chlorinated materials appear in the distillate. Whether this is due to a depolymerizing action occasioned by the ethyl hydrogen sulfate present during the distillation or is due to no polymerization having occurred, or is caused by some other factor, is not readily apparent. It is sufficient to note that the result of such a distillation for separating crude chloral from ethyl hydrogen sulfate differs from the result obtained when operating a process of the present invention.

The crude chloral which is treated according to a process of the present invention may be any chloral which contains under-chlorinated materials, that is, materials having fewer than 3 chlorine atoms on the carbon atom adjacent to the aldehyde group. Such a product may be obtained by chlorinating ethyl alcohol under ultraviolet light as above-described until the density of the reaction mixture is about from 1.51 to 1.55, adding at least one mol of concentrated sulfuric acid for each mol of the hemiacetal so obtained, and distilling off the crude chloral products containing under-chlorinated materials.

Polymerization of under-chlorinated materials in such a crude chloral may be effected according to a process of this invention by adding a small amount of concentrated sulfuric acid. The sulfuric acid apparently acts as a catalyst for the polymerization and is used in catalytic amounts, that is, up to about 5% by weight of 98% sulfuric acid, based on the weight of the mixture. Particularly good results are obtained using about ½% by weight of sulfuric acid. The strength of the acid should be at least about 92% $H_2SO_4$ by weight.

After adding the sulfuric acid the mixture is allowed to stand for a time sufficient to permit the under-chlorinated materials to polymerize. The length of time required will vary with such conditions as the concentration of sulfuric acid, the proportion of under-chlorinated material in the chloral, and the temperature. It is generally preferred to allow enough time to be sure that all under-chlorinated materials have polymerized to the fullest possible extent. Thus, while substantial polymerization may be effected in as short a time as one hour, best results are obtained by allowing from about 8 to 24 hours. The mixture may be agitated during the reaction period but ordinarily agitation is of no substantial benefit after homogeneity in the reaction mixture has been achieved.

Following polymerization the under-chlorinated materials are separated from the non-polymerized chloral by any suitable method. If the proportion of under-chlorinated constituents in the crude chloral is large the polymerized material will precipitate out and may be filtered off or may be removed in a centrifuge. If the proportion of under-chlorinated material is not sufficiently large to form a separate phase when polymerized it may be separated from the non-polymerized chloral by fractional distillation, the boiling point of the polymers being substantially above that of the chloral. The polymerized material may also be separated from the chloral by adding the mixture to water, whereby the polymer precipitates out. Similarly, combinations of these methods and other suitable means may be employed.

The improvement in quality which can be effected in a crude chloral according to a process of this invention is indicated by an increase in the chlorine content of the chloral. Trichloracetaldehyde (chloral) has a chlorine content of 72.17% whereas dichloracetaldehyde has a chlorine content of 62.78%.

The nature of this invention and its manner of application will be more fully apparent from the following illustrative example.

Example

To 500 parts by weight of crude chloral, having a chlorine content of 70.62% there was added 2.5 parts by weight of concentrated sulfuric acid (96% $H_2SO_4$). The mixture was allowed to stand for 16 hours at about 25° C. At the end of this time a substantial amount of polymerized, under-chlorinated material had formed as a precipitate. The mixture was then subjected to distillation under reduced pressure, the pressure being 50 mm. of mercury. The distillate, amounting to 76.5% of the input, consisted of chloral having an average chlorine content of 71.2% as compared to 70.62% in the starting material, indicating that a substantial removal of under-chlorinated material had been effected.

We claim:

1. In a process for purifying crude chloral containing under-chlorinated materials, the steps comprising adding not more than about 5% by weight of concentrated sulfuric acid to said crude chloral, allowing the mixture to stand for at least one hour whereby the said under-chlorinated constituents are polymerized, and separating the constituents so polymerized from the chloral.

2. In a process for purifying crude chloral containing under-chlorinated materials, the steps comprising adding not more than about 5% by weight of concentrated sulfuric acid to said crude chloral, allowing the mixture to stand for at least one hour whereby the said under-chlorinated constituents are polymerized, and separating the constituents so polymerized from the chloral by distilling off the non-polymerized chloral at reduced pressure.

3. In a process for purifying chloral containing under-chlorinated constituents, the steps comprising adding about one-half per cent by weight of sulfuric acid containing at least 92 per cent $H_2SO_4$, allowing the mixture to stand for about from 8 to 24 hours, whereby the said under-chlorinated constituents are polymerized, and separating the constituents so polymerized from the chloral.

4. In a process for purifying chloral containing under-chlorinated constituents, the steps comprising adding about one-half per cent by weight of sulfuric acid containing at least 92 per cent $H_2SO_4$, allowing the mixture to stand for about from 8 to 24 hours, whereby the said under-chlorinated constituents are polymerized, and separating the constituents so polymerized from the chloral by distilling off the non-polymerized chloral at reduced pressure.

HAROLD C. BEACHELL.
MICHAEL SVEDA.

REFERENCES CITED

The following references are of record in the file of this patent:

UNITED STATES PATENTS

| Number | Name | Date |
|---|---|---|
| 774,154 | Besson | Nov. 8, 1904 |

OTHER REFERENCES

La Nature, Feb. 6, 1926, pages 81, 82, and 83. Copy in Scientific Library.

Certificate of Correction

Patent No. 2,473,003 June 14, 1949

HAROLD C. BEACHELL ET AL.

It is hereby certified that error appears in the printed specification of the above numbered patent requiring correction as follows:

Column 1, line 20, for that portion of the formula reading "ClCCHO" read $Cl_3CCHO$;

and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*